(12) United States Patent
Kim et al.

(10) Patent No.: US 11,539,060 B2
(45) Date of Patent: Dec. 27, 2022

(54) MEMBRANE HUMIDIFIER FOR FUEL CELL

(71) Applicant: Kolon Industries, Inc., Seoul (KR)

(72) Inventors: Do-Woo Kim, Seoul (KR); Kyoung-Ju Kim, Seoul (KR); In-Ho Kim, Seoul (KR); Na-Hyeon An, Seoul (KR); Jin-Hyung Lee, Seoul (KR)

(73) Assignee: Kolon Industries, Inc., Seoul (KR)

( * ) Notice: Subject to any disclaimer, the term of this patent is extended or adjusted under 35 U.S.C. 154(b) by 199 days.

(21) Appl. No.: 16/958,373

(22) PCT Filed: Jun. 29, 2018

(86) PCT No.: PCT/KR2018/007416
§ 371 (c)(1),
(2) Date: Jun. 26, 2020

(87) PCT Pub. No.: WO2019/132141
PCT Pub. Date: Jul. 4, 2019

(65) Prior Publication Data
US 2021/0057767 A1 Feb. 25, 2021

(30) Foreign Application Priority Data

Dec. 29, 2017 (KR) .................. 10-2017-0184480
Jun. 5, 2018 (KR) .................. 10-2018-0065091

(51) Int. Cl.
*H01M 8/04* (2016.01)
*H01M 8/04119* (2016.01)
*H01M 8/04828* (2016.01)

(52) U.S. Cl.
CPC ..... *H01M 8/04149* (2013.01); *H01M 8/0485* (2013.01)

(58) Field of Classification Search
CPC ................ H01M 8/04149; H01M 8/0485
USPC .................................................. 261/100
See application file for complete search history.

(56) References Cited

U.S. PATENT DOCUMENTS

2009/0108476 A1 4/2009 Eping
2011/0000842 A1 1/2011 Takagi
2011/0297261 A1 12/2011 Martinchek
(Continued)

FOREIGN PATENT DOCUMENTS

CN 101534934 A 9/2009
CN 102648547 A 8/2012
(Continued)

OTHER PUBLICATIONS

Counterpart European search report dated Jul. 1, 2021.
(Continued)

*Primary Examiner* — James M Erwin
(74) *Attorney, Agent, or Firm* — Harvest IP Law LLP

(57) ABSTRACT

A membrane humidifier for a fuel cell is disclosed. The membrane includes a middle case in which a plurality of hollow fiber membranes are accommodated; a cap case coupled to the middle case; a potting part formed at the end portions of the plurality of hollow fiber membranes; and an assembling member disposed between the end portions of the cap case and the middle case, and simultaneously coupling, so as to be airtight, a gap between the cap case and the middle case and a gap between the cap case and the potting part.

20 Claims, 14 Drawing Sheets

(56) References Cited

U.S. PATENT DOCUMENTS

| | | | |
|---|---|---|---|
| 2014/0291874 A1* | 10/2014 | Kim | F24F 6/04 261/101 |
| 2016/0079616 A1 | 3/2016 | Lee et al. | |
| 2016/0193570 A1 | 7/2016 | Kobayashi et al. | |
| 2016/0240870 A1* | 8/2016 | Kim | B01D 71/68 |
| 2017/0279138 A1* | 9/2017 | Desjardins | H01M 8/04126 |

FOREIGN PATENT DOCUMENTS

| | | |
|---|---|---|
| CN | 107004872 A | 8/2017 |
| DE | 102014104960 A1 | 10/2014 |
| JP | 2009208013 A | 9/2009 |
| JP | 2011043347 A | 3/2011 |
| JP | 2014522556 A | 9/2014 |
| JP | 2016518975 A | 6/2016 |
| KR | 10-2010-0129285 A | 12/2010 |
| KR | 10-2013-0034404 A | 4/2013 |
| KR | 10-2014-0125098 A | 10/2014 |
| KR | 10-2016-0061988 A | 6/2016 |
| KR | 10-2016-0150415 A | 12/2016 |
| WO | 9212787 A1 | 8/1992 |
| WO | 2000053293 A1 | 9/2000 |
| WO | 0160502 A1 | 8/2001 |
| WO | 2013100677 A1 | 7/2013 |
| WO | 2015046430 A1 | 4/2015 |

OTHER PUBLICATIONS

International Search Report for PCT/KR2018/007416 dated Oct. 25, 2018 (PCT/ISA/210).
JP office action dated Jun. 24, 2021.
CN office action dated Oct. 25, 2022.

* cited by examiner

MEMBRANE HUMIDIFIER FOR FUEL CELL

CROSS REFERENCE TO RELATED APPLICATIONS

This application is a National Stage of International Application No. PCT/KR2018/007416 filed Jun. 29, 2018, claiming priorities based on Korean Patent Application No. 10-2017-0184480 filed Dec. 29, 2017 and Korean Patent Application No. 10-2018-0065091 filed Jun. 5, 2018.

TECHNICAL FIELD

The present disclosure relates to a membrane humidifier for a fuel cell, and more particularly to a membrane humidifier for a fuel cell capable of performing a hermetic sealing function in high-temperature/high-pressure/high-humidity environments through a mechanical assembly structure.

BACKGROUND ART

A fuel cell is a power generation cell that combines hydrogen and oxygen to generate electricity. Such a fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may be classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell (PEMFC) is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors that improve the performance of the polymer electrolyte membrane fuel cell (PEMFC) is to supply a predetermined amount or more of moisture to a polymer electrolyte membrane or a proton exchange membrane (PEM) of a membrane electrode assembly (MEA) in order to retain water content. The reason for this is that, in the case in which the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas flowing pipe through a solenoid valve, and 3) a humidification membrane method of supplying moisture to a gas flowing layer using a polymer separation membrane are used as methods of humidifying the polymer electrolyte membrane or the proton exchange membrane.

Among these methods, the humidification membrane method, which provides water vapor to a gas that is supplied to the polymer electrolyte membrane or the proton exchange membrane using a membrane configured to selectively transmit only water vapor included in an exhaust gas in order to humidify the polymer electrolyte membrane or the proton exchange membrane, is advantageous in that it is possible to reduce the weight and size of a humidifier.

In the case in which a module is formed, a hollow fiber membrane having large transmission area per unit volume is preferably used as the selective transmission membrane used in the humidification membrane method. That is, in the case in which a membrane humidifier is manufactured using a hollow fiber membrane, high integration of the hollow fiber membrane having large contact surface area is possible, whereby it is possible to sufficiently humidify a fuel cell even in the case of a small capacity, it is possible to use a low-priced material, and it is possible to collect moisture and heat included in a non-reaction gas discharged from the fuel cell at a high temperature and to reuse the collected moisture and heat through the humidifier.

Meanwhile, in a general membrane humidifier for a fuel cell, hollow fiber membranes are received in a housing unit, and the hollow fiber membranes are adhered to the inner wall of the housing unit by a potting unit. A specific number of hollow fiber membranes are received based on a desired output value of a stack, and the hollow fiber membranes are adhered and fixed to the housing unit by the potting unit. High-temperature air from a blower and high-temperature and high-humidity air from the stack are introduced into the membrane humidifier for a fuel cell. The coefficient of thermal expansion and the coefficient of thermal shrinkage of the potting unit are high, whereby a gap is formed between the housing unit and the potting unit and air leaks therethrough. In order to prevent this, a sealant is coated in the gap between the housing unit and the potting unit.

In a case of air leakage, the air introduced from the blower leaks from the membrane humidifier for a fuel cell, whereby the amount of air that is introduced into the stack is reduced. For this reason, it is necessary for the blower to supply a larger amount of air than the amount of air actually necessary for the stack, whereby the power consumption of the blower is increased, which leads to system power loss. Consequently, maximum leakage prevention is advantageous in terms of overall power efficiency.

DISCLOSURE

Technical Problem

It is an object of the present disclosure to provide a membrane humidifier for a fuel cell capable of performing a hermetic sealing function in high-temperature/high-pressure/high-humidity environments through a mechanical assembly structure.

Technical Solution

A membrane humidifier for a fuel cell according to an embodiment of the present disclosure includes a middle case housing a plurality of hollow fiber membranes, a cap case coupled to the middle case, a potting unit formed at ends of the plurality of hollow fiber membranes, and an assembly member disposed between the cap case and the end of the middle case, the assembly member being configured to simultaneously perform hermetic coupling between the cap case and the middle case and between the cap case and the potting unit.

The assembly member may include a first sealing unit mounted on the end of the middle case while being in contact with the inner wall of the cap case and a second sealing unit formed inside the first sealing unit so as to wrap the potting unit.

The first sealing unit may include a first sealing body mounted on the end of the middle case while being in contact with the inner wall of the cap case, the first sealing body being formed so as to have a bracket shape, and a first sealing leg formed so as to come into contact with the second sealing unit while extending downwards from one end of the first sealing body.

The first sealing unit may further include an extension leg extending inwards from the end of the first sealing leg and then extending upwards from the end thereof such that the extension leg wraps the second sealing unit.

The first sealing unit may further include a second sealing leg extending downwards from the other end of the first sealing body, the second sealing leg being in contact with the inner wall of the cap case and the end of the middle case.

The first sealing unit may further include a second sealing leg extending downwards from the other end of the first sealing body, the second sealing leg being in contact with the inner wall of the cap case and the end of the middle case.

The second sealing unit may include a second sealing body formed so as to wrap the potting unit and a sealing arm inserted into the first sealing body.

The first sealing unit may be made of a soft material, and the second sealing unit may be made of a hard material.

A membrane humidifier for a fuel cell according to another embodiment of the present disclosure may include a middle case housing a plurality of hollow fiber membranes, a cap case coupled to the middle case, a potting unit formed at ends of the plurality of hollow fiber membranes, and an assembly member disposed between the cap case and the end of the middle case, the assembly member being configured to simultaneously perform hermetic coupling between the cap case and the middle case and between the cap case and the potting unit.

The cap case may include a large-diameter portion coupled to the middle case, the large-diameter portion having an inner diameter greater than the outer diameter of the potting unit, and a small-diameter portion protruding from one surface of the large-diameter portion, the small-diameter portion having an inner diameter less than the outer diameter of the potting unit.

The assembly member may include a main body disposed between the cap case, the middle case, and the potting unit, a first coupling portion pressed between the cap case and the end of the middle case in order to perform hermetic coupling between the cap case and the middle case, and a second coupling portion brought into contact with one end of the potting unit in order to perform hermetic coupling between the cap case and the potting unit.

The first coupling portion may include a first extension portion extending outwards from the main body.

The first coupling portion may further include a second extension portion extending from the end of the first extension portion so as to come into contact with an outer surface of the middle case.

A step portion configured to receive the second extension portion of the first coupling portion may be provided at the outer surface of the end of the middle case.

The cap case may include a protrusion protruding from the surface thereof, the surface facing the end of the middle case.

The second coupling portion of the assembly member may include an inclined portion formed at the inner surface thereof, and the potting unit may include an inclined portion formed at the end edge thereof, the inclined portion of the potting unit being in contact with the inclined portion of the second coupling portion.

The hardness of the assembly member may be less than the hardness of the potting unit.

The plurality of hollow fiber membranes may be housed in a cartridge, and the cartridge may include an extension rib extending outwards from one end thereof, the extension rib being configured to support one surface of the assembly member.

The assembly member may further include a rib extending inwards so as to widen the surface area thereof that contacts the potting unit.

The hardness of the assembly member may be greater than the hardness of the potting unit and may be less than the hardness of the middle case and the hardness of the cap case.

Advantageous Effects

A membrane humidifier for a fuel cell according to the present disclosure is capable of performing a hermetic sealing function in high-temperature/high-pressure/high-humidity environments through a mechanical assembly structure.

In addition, a mechanical sealing method is used instead of a chemical sealing method, whereby it is possible to omit a polyurethane/sealant coating and curing process necessary for a conventional chemical sealing method, and therefore it is possible to shorten working time, to improve work efficiency, and to construct a mass production system.

In addition, when unit cartridges disposed in the membrane humidifier are defective, reworkability is excellent, whereby it is possible to reduce a part scrap rate.

In addition, the membrane humidifier may be disassembled, only defective cartridges may be replaced, and then the membrane humidifier may be reassembled, whereby the present disclosure is advantageous in terms of reworkability and reuse of parts.

Furthermore, it is possible to simultaneously perform hermetic coupling between two or more parts using two separable assembly members or a single integrated assembly member, whereby manufacture and assembly are very convenient and efficient.

BEST MODE

The present disclosure may be changed in various manners and may have various embodiments, wherein specific embodiments will be illustrated and described in detail in the following detailed description. However, the present disclosure is not limited to the specific embodiments, and it should be understood that the present disclosure includes all modifications, equivalents, or substitutions included in the idea and technical scope of the present disclosure.

The terms used in the present disclosure are provided only to describe the specific embodiments, and do not limit the present disclosure. Singular forms are intended to include plural forms as well, unless the context clearly indicates otherwise. In the present disclosure, it should be understood that the terms "includes," "has," etc. specify the presence of features, numbers, steps, operations, elements, components, or combinations thereof described in the specification, but do not preclude the presence or addition of one or more other features, numbers, steps, operations, elements, components, or combinations thereof.

Hereinafter, a membrane humidifier for a fuel cell according to an embodiment of the present disclosure will be described with reference to the accompanying drawings.

Figure 1:
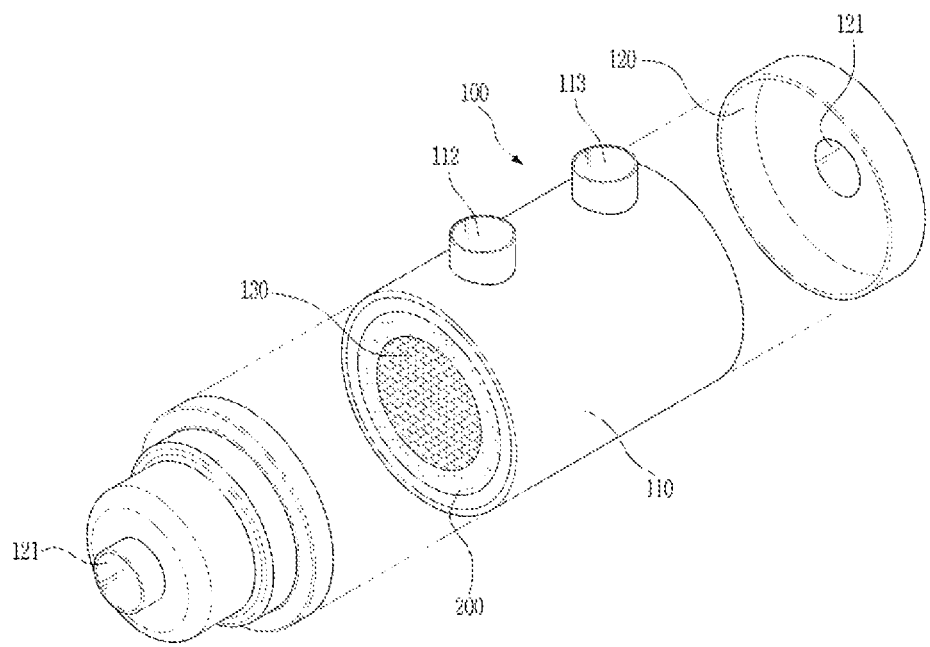
FIGS. 1 and 2 are views showing a membrane humidifier for a fuel cell according to an embodiment of the present disclosure.
Figure 2:
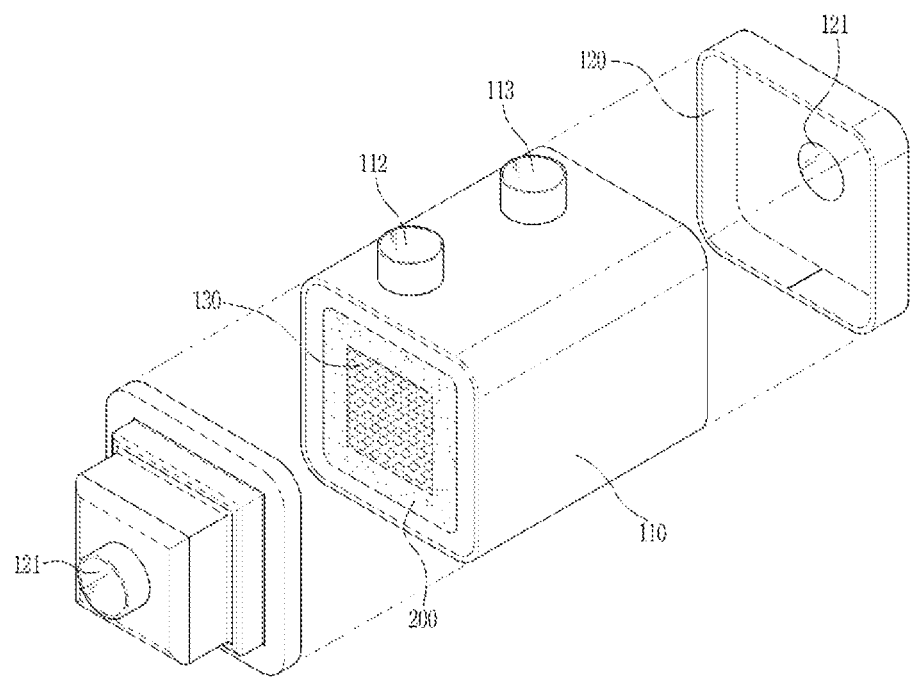

FIGS. 1 and 2 are views showing a membrane humidifier for a fuel cell according to an embodiment of the present disclosure. As shown in FIGS. 1 and 2, the membrane humidifier for a fuel cell according to the embodiment of the present disclosure includes a middle case 110, cap cases 120, potting units 130, and assembly members 200.

The middle case 110 is coupled to the cap cases 120 to define the external appearance of the membrane humidifier. Each of the middle case 110 and the cap cases 120 may be made of hard plastic, such as polycarbonate, or metal. The lateral sectional shape of each of the middle case 110 and the cap cases 120 may be a circle, as shown in FIG. 1, or the lateral sectional shape thereof may be a polygon, as shown in FIG. 2. The polygon may be a rectangle, a square, a trapezoid, a parallelogram, a pentagon, or a hexagon, and corners of the polygon may be round. In addition, the circle may be an oval. The middle case 110 is provided with a second fluid inlet 112, through which a second fluid is supplied, and a second fluid outlet 113, through which the second fluid is discharged. Alternatively, reference numeral 113 may indicate the second fluid inlet, and reference numeral 112 may indicate the second fluid outlet.

A hollow fiber membrane module, in which a plurality of hollow fiber membranes is housed, is disposed in the middle case 110. The hollow fiber membrane module may include a hollow fiber membrane bundle constituted by a plurality of integrated hollow fiber membranes or a plurality of hollow fiber membrane cartridges C, in each of which hollow fiber membranes are housed. The drawings illustrate the case in which the hollow fiber membrane module includes hollow fiber membrane cartridges C; however, the case in which the hollow fiber membrane module includes a hollow fiber membrane bundle is not excluded.

The cap cases 120 are coupled to the respective ends of the middle case 110. The cap cases 120 are provided with fluid introduction and discharge ports 121, one of which is a first fluid inlet and the other of which is a first fluid outlet. A first fluid introduced through the fluid introduction and discharge port 121 of one of the cap cases 120 passes through an inner pipeline of each of the hollow fiber membranes housed in each of the hollow fiber membrane cartridges C and is then discharged outside through the fluid introduction and discharge port 121 of the other cap case 120. Each hollow fiber membrane may be a hollow fiber membrane made of, for example, Nafion, polyetherimide, polyimide (PI), polyphenylsulfone, polysulfone (PS), or polyethersulfone (PES).

In the case in which the hollow fiber membrane module includes a plurality of hollow fiber membrane cartridges C, the hollow fiber membrane cartridges C may be provided at one side thereof with a first mesh unit M configured to allow the second fluid introduced into the membrane humidifier through the second fluid inlet 112 to be introduced into the hollow fiber membrane cartridges C therethrough, and may be provided at the other side thereof with a second mesh unit (not shown) configured to allow the second fluid that has performed moisture exchange in the hollow fiber membrane cartridges C to be discharged from the hollow fiber membrane cartridges C there through.

The hollow fiber membrane bundle or the hollow fiber membrane cartridges C are provided at opposite ends thereof with potting units 130 configured to bind the hollow fiber membranes and to fill the gaps between the hollow fiber membranes. As a result, the opposite ends of the hollow fiber membrane module are blocked by the potting units 130, whereby a flow channel configured to allow the second fluid to pass therethrough is defined in the hollow fiber membrane module. Each of the potting units 130 is made of a known material, and a detailed description thereof will be omitted from this specification.

Figure 3:
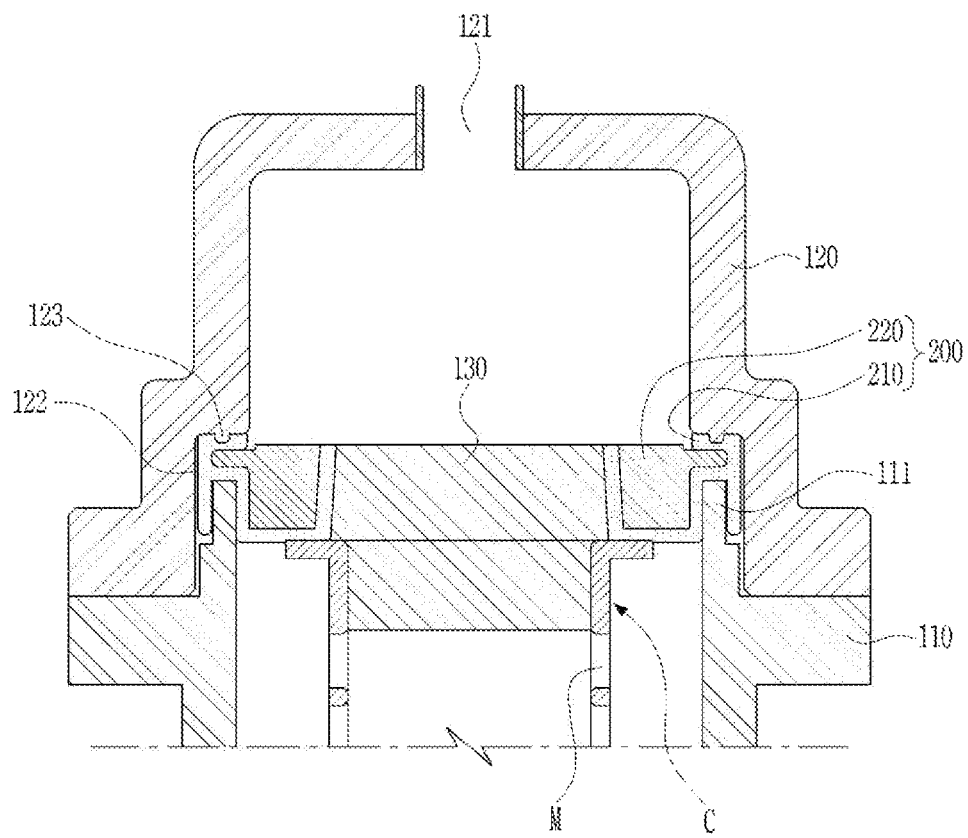
FIG. 3 is a sectional view showing a portion of the membrane humidifier for a fuel cell according to the embodiment of the present disclosure.

FIG. 3 is a sectional view showing a portion of the membrane humidifier for a fuel cell according to the embodiment of the present disclosure. As shown in FIG. 3, the assembly member 200 includes a first sealing unit 210 and a second sealing unit 220. The assembly member 200 is disposed between the potting unit 130 and the end 111 of the middle case 110 in order to simultaneously seal the interior of the middle case 110 and the gap between the middle case 110 and the cap case 120.

The first sealing unit 210 is made of a soft material, i.e. a material that exhibits low hardness, such as silicone or soft rubber, and the second sealing unit 220 is made of a hard material, i.e. a material that exhibits high hardness, such as plastic, metal, or hard rubber. Here, hardness is determined based on ASTM D2240 (Shore A) 70 degrees. That is, a material that has a hardness of 70 degrees or more is a hard material, and a material that has a hardness of less than 70 degrees is a soft material.

The assembly member 200 may be configured such that the soft first sealing unit 210 wraps the hard second sealing unit 220, and may perform a hermetic sealing function in high-temperature/high-pressure/high-humidity environments through a peculiar mechanical assembly structure.

The first sealing unit 210 is mounted on the end 111 of the middle case while being in contact with an inner wall 122 of the cap case. The second sealing unit 220 is formed inside the first sealing unit 210, and is configured to wrap the potting unit 130.

During an assembly process, the soft first sealing unit 210 presses the inner wall 122 of the cap case while being compressed by the hard second sealing unit 220 to hermetically seal the space defined by the cartridge C and the cap case 120 and the internal space of the middle case 110. In some embodiments, a coupling protrusion 123 may be formed on the inner wall of the cap case 120, and the coupling protrusion 123 increases the force of fixing between the cap case 120 and the assembly member 200 at the time of assembly of the membrane humidifier.

The assembly member 200 may be realized as various embodiments depending on the material of the potting unit 130.

Figure 4:
FIG. 4 is a sectional view showing a first embodiment of an assembly member according to the present disclosure.
Figure 5:
FIG. 5 is a sectional view showing a second embodiment of the assembly member according to the present disclosure.
Figure 6:
FIG. 6 is a sectional view showing a third embodiment of the assembly member according to the present disclosure.

Hereinafter, various shapes of the assembly member 200 will be described with reference to FIGS. 4 to 6. FIG. 4 is a sectional view showing a first embodiment of an assembly member according to an embodiment of the present disclosure, FIG. 5 is a sectional view showing a second embodiment of the assembly member according to the embodiment of the present disclosure, and FIG. 6 is a sectional view showing a third embodiment of the assembly member according to the embodiment of the present disclosure.

As shown in FIG. 4, the assembly member according to the first embodiment is constituted by a first sealing unit 210, which includes a first sealing body 211 and a first sealing leg 212, and a second sealing unit 220, which includes a second sealing body 221 and a sealing arm 222.

Figure 9:
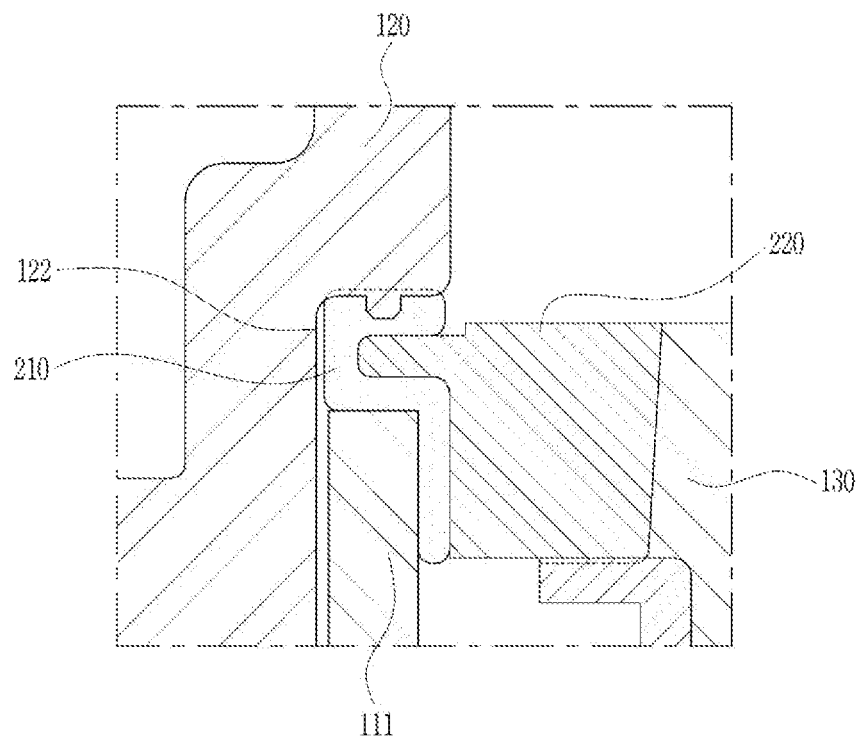
FIG. 9 is a partial enlarged view showing the state in which the assembly member of FIG. 4 seals the membrane humidifier for a fuel cell.

The first sealing body 211 is formed so as to come into contact with the inner wall of the cap case 120 while having a bracket shape, and the first sealing leg 212 is formed so as to come into contact with the second sealing unit 220 while extending downwards from one end of the first sealing body 211 (see FIG. 9).

During the assembly process of the membrane humidifier, the first sealing body 211 presses the inner wall 122 of the cap case while being compressed by the second sealing unit 220, and the first sealing leg 212 presses the end 111 of the middle case 110 while being compressed by the second sealing unit 220, to hermetically seal the space defined by the cartridge C and the cap case 120 and the internal space of the middle case 110.

Each of the second sealing body 221 and the sealing arm 222 is made of a hard material. The sealing arm 222 presses the first sealing body 211, and the second sealing body 221 presses the first sealing leg 212.

Figure 12:
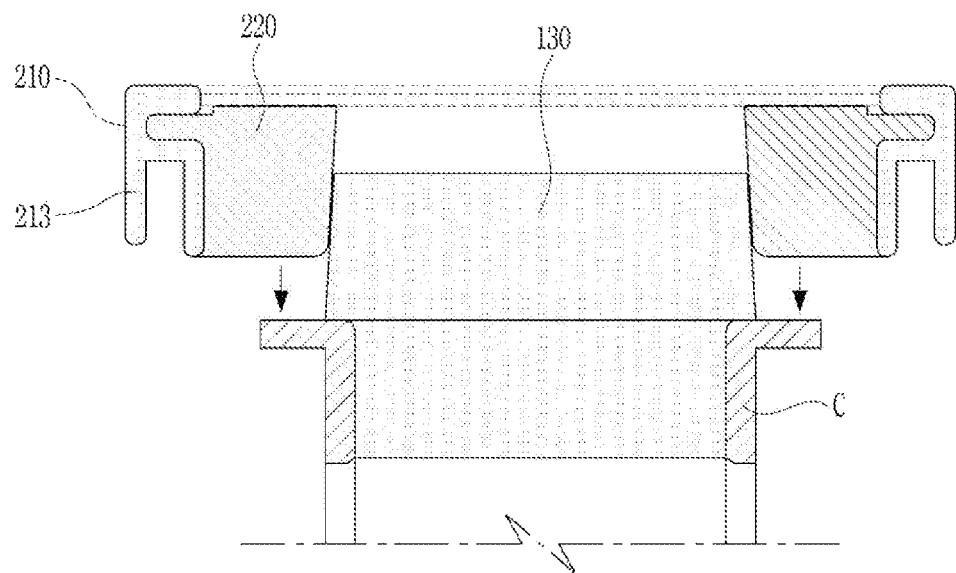
FIG. 12 is a partial enlarged view showing the process in which the assembly member of FIG. 5 is inserted into a potting unit.
Figure 13:
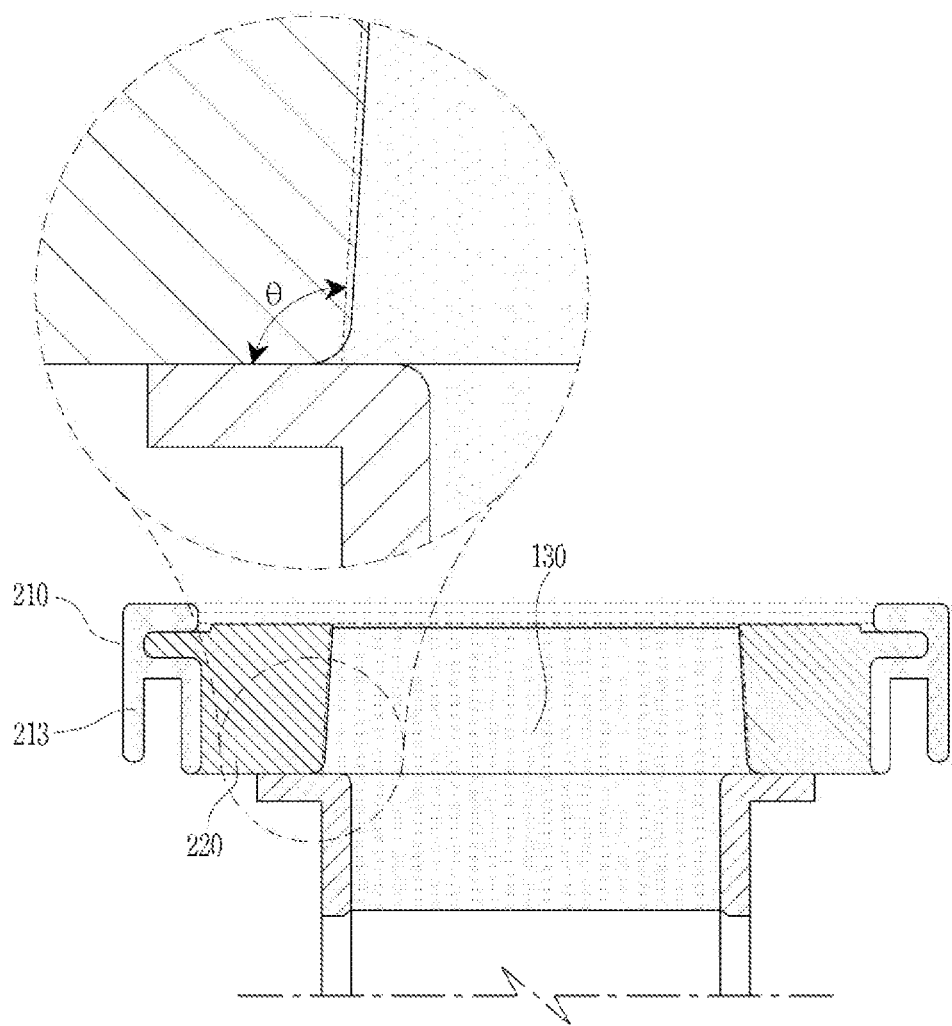
FIG. 13 is a partial enlarged view showing the state in which the assembly member of FIG. 5 is inserted in the potting unit.

The assembly member according to the first embodiment is useful in the case in which the potting unit 130 is made of a soft material. In the assembly member according to the first embodiment, the second sealing body 221 is inserted into the soft potting unit 130 while pressing the potting unit 130 inwards during the assembly process of the membrane humidifier. The second sealing body 221 and the potting unit 130 are hermetically sealed by restoring force of the potting unit 130 made of a soft material, by which the potting unit returns to the original position thereof. At the same time, the second sealing body 221 presses the first sealing leg 212, and the first sealing leg 212 presses the end 111 of the middle case 110 while being compressed by the second sealing body 221, whereby the space defined by the cartridge C and the cap case 120 and the internal space of the middle case 110 are hermetically sealed (see FIGS. 12 and 13). At this time, the angle θ between the bottom surface and the side surface of the second sealing body 221 is preferably greater than 90 degrees in order to achieve easy assembly between the assembly member and the potting unit 130 and compression of the assembly member.

As shown in FIG. 5, the assembly member according to the second embodiment is constituted by a first sealing unit 210, which includes a first sealing body 211, a first sealing leg 212, and a second sealing leg 213, and a second sealing unit 220, which includes a second sealing body 221 and a sealing arm 222. Here, the first sealing body 211, the first sealing leg 212, the second sealing body 221, and the sealing arm 222 are identical to those of the first embodiment, and a duplicate description thereof will be omitted.

Figure 10:
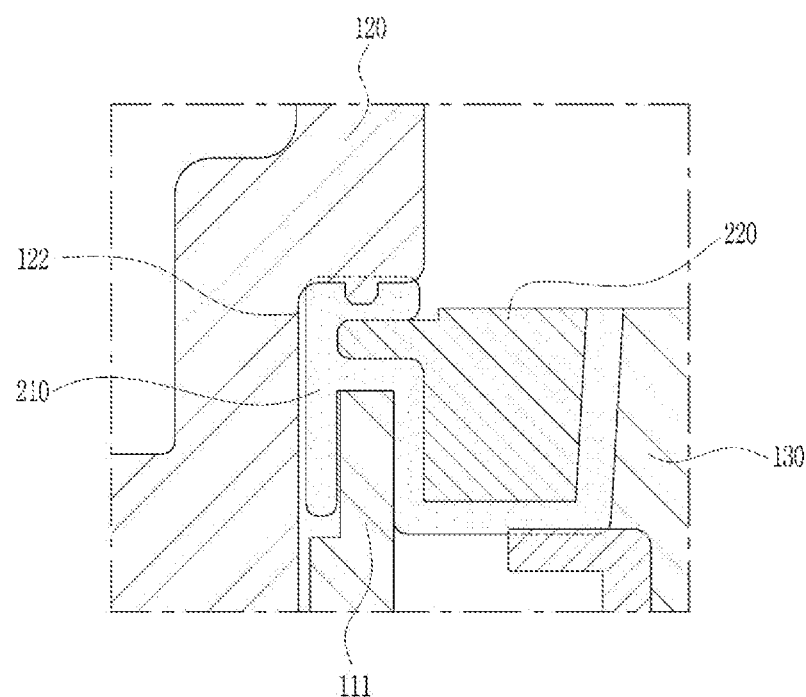
FIG. 10 is a partial enlarged view showing the state in which the assembly member of FIG. 5 seals the membrane humidifier for a fuel cell.

The first sealing leg 212 extends downwards from one end of the first sealing body 211, and the second sealing leg 213 extends downwards from the other end of the first sealing body 211. The end 111 of the middle case 110 is inserted into the gap between the first sealing leg 212 and the second sealing leg 213. At this time, the end 111 of the middle case 110 is provided with a step portion, on which the second sealing leg 213 is fitted (see FIG. 10).

The assembly member according to the second embodiment has an advantage in that the end 111 of the middle case 110 is inserted into the gap between the first sealing leg 212 and the second sealing leg 213, whereby the force of coupling between the assembly member 200 and the middle case 110 is further increased.

As shown in FIG. 6, the assembly member according to the third embodiment is constituted by a first sealing unit 210, which includes a first sealing body 211, a first sealing leg 212, a second sealing leg 213, and an extension leg 214, and a second sealing unit 220, which includes a second sealing body 221 and a sealing arm 222. Here, the first sealing body 211, the first sealing leg 212, the second sealing leg 213, the second sealing body 221, and the sealing arm 222 are identical to those of the second embodiment, and a duplicate description thereof will be omitted.

Figure 11:
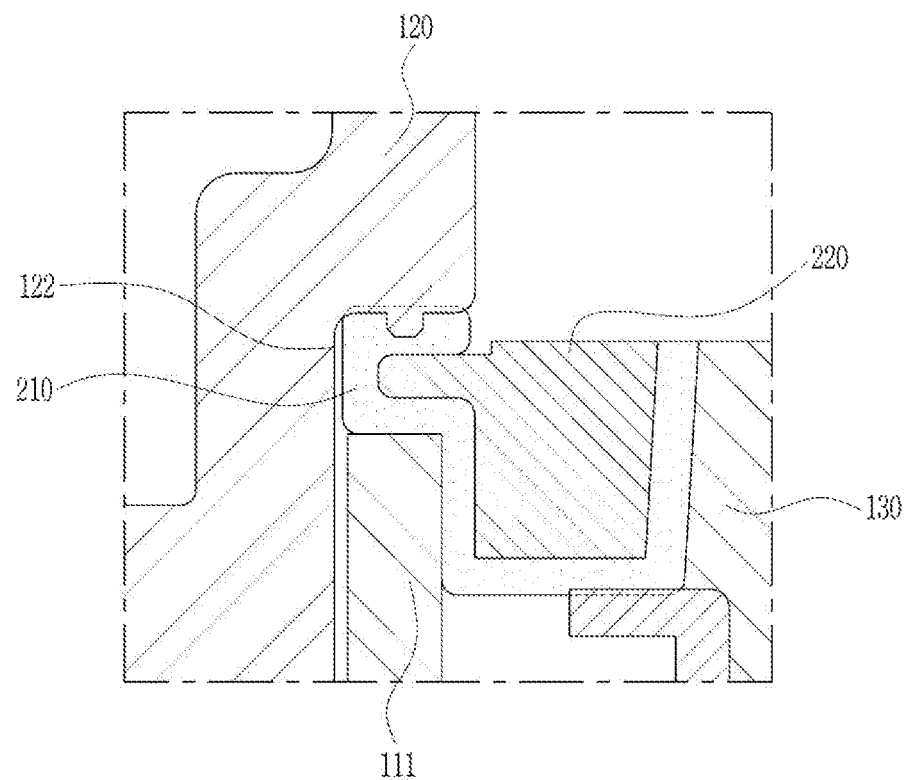
FIG. 11 is a partial enlarged view showing the state in which the assembly member of FIG. 6 seals the membrane humidifier for a fuel cell.

The extension leg 214 is made of a soft material, and extends inwards from the end of the first sealing leg 212 and then extends upwards from the end thereof in order to wrap the second sealing unit 220 (specifically, the second sealing body 221) (see FIG. 11).

Figure 14:
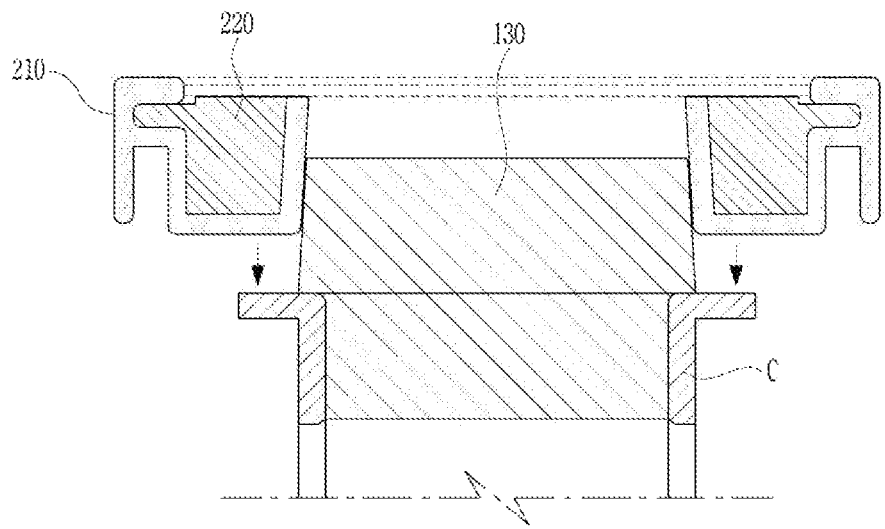
FIG. 14 is a partial enlarged view showing the process in which the assembly member of FIG. 6 is inserted into the potting unit.
Figure 15:
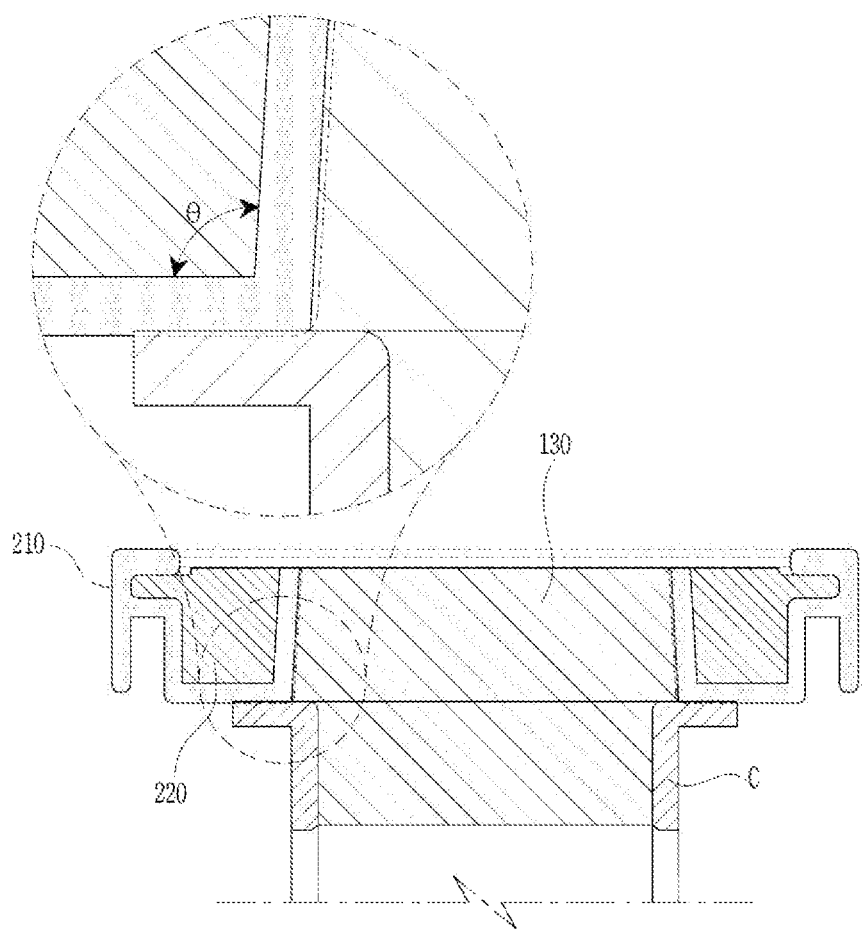
FIG. 15 is a partial enlarged view showing the state in which the assembly member of FIG. 6 is inserted into the potting unit.

The assembly member according to the third embodiment is useful in the case in which the potting unit 130 is made of a hard material. In the assembly member according to the third embodiment, the soft extension leg 214 is inserted into the hard potting unit 130 while being compressed by the potting unit 130 during the assembly process of the membrane humidifier. The assembly member and the potting unit are hermetically sealed by restoring force of the soft extension leg 214, by which the extension leg returns to the original position thereof. At the same time, the second sealing body 221 presses the first sealing leg 212, and the first sealing leg 212 presses the end 111 of the middle case 110 while being compressed by the second sealing body 221, whereby the space defined by the cartridge C and the cap case 120 and the internal space of the middle case 110 are hermetically sealed (see FIGS. 14 and 15). At this time, the angle θ between the bottom surface and the side surface of the second sealing body 221 is preferably greater than 90 degrees in order to achieve easy assembly between the assembly member and the potting unit 130 and compression of the assembly member.

The assembly member according to each of the first and second embodiments is useful in the case in which the potting unit 130 is made of a soft material, and the assembly member according to the third embodiment is useful in the case in which the potting unit 130 is made of a hard material.

Figure 7:
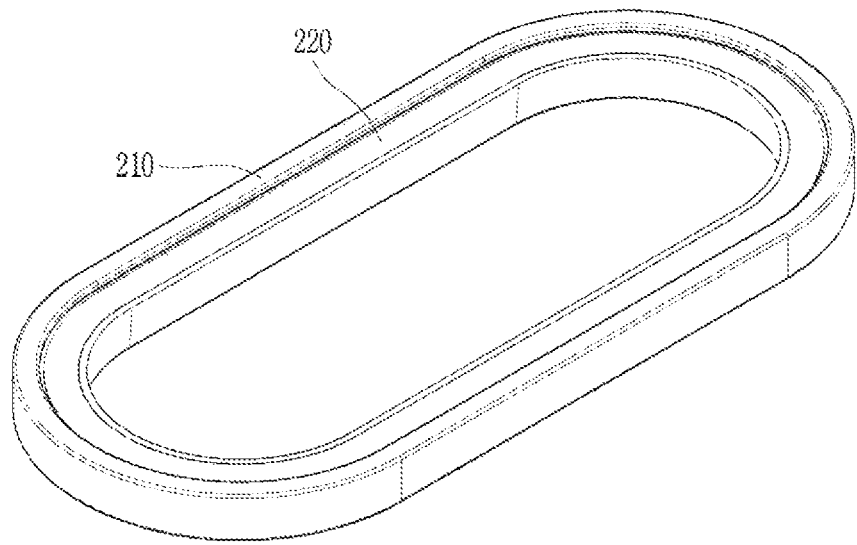
FIG. 7 is a perspective view showing the third embodiment of the assembly member according to the present disclosure.
Figure 8:
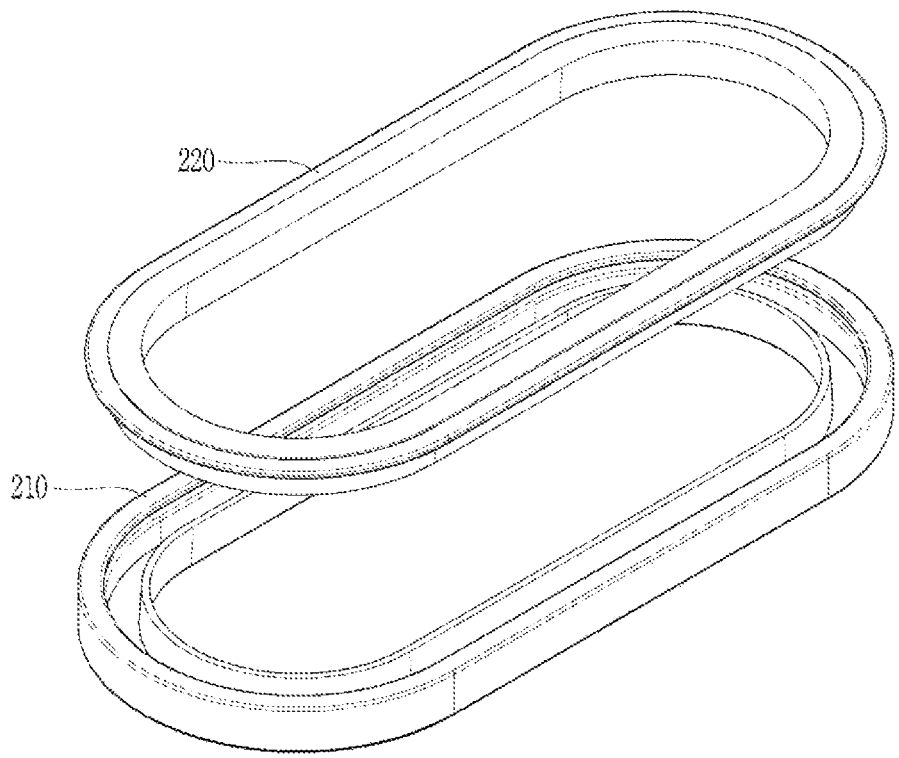
FIG. 8 is an exploded perspective view showing the third embodiment of the assembly member according to the present disclosure.

As shown in FIGS. 7 and 8, the assembly member according to each of the first to third embodiments is formed in a circular ring shape or an oval ring shape, and is disposed between the potting unit 130 and the end 111 of the middle case. FIGS. 7 and 8 illustrate the assembly member according to the third embodiment, from which the assembly member according to each of the first and second embodiments is easily derived, and therefore an illustration thereof will be omitted.

Next, the assembly structure of a membrane humidifier for a fuel cell according to another embodiment of the present disclosure will be described.

Figure 16:
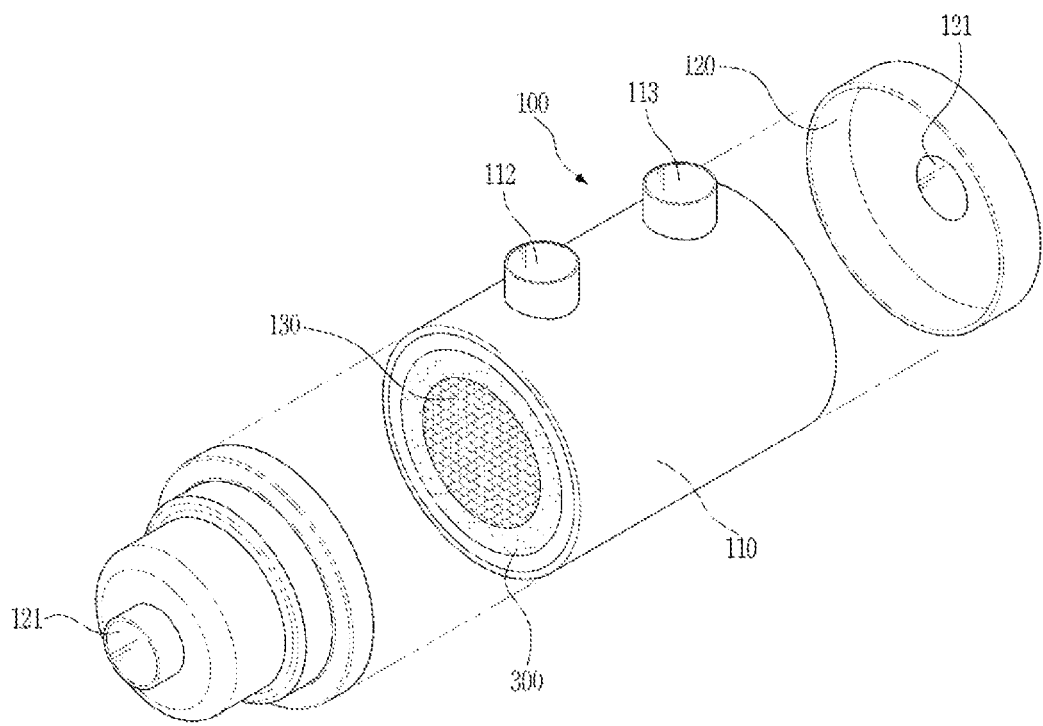
FIGS. 16 and 17 are exploded perspective views showing a membrane humidifier for a fuel cell according to an embodiment of the present disclosure.
Figure 17:
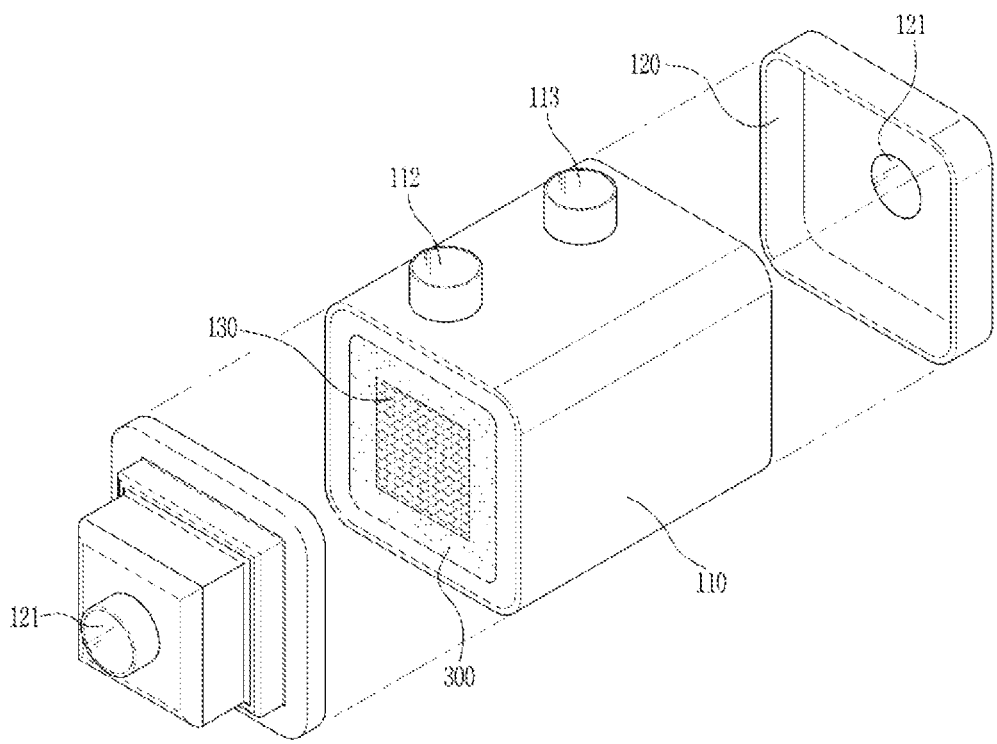

FIGS. 16 and 17 are exploded perspective views showing a membrane humidifier for a fuel cell according to another embodiment of the present disclosure. As shown in FIGS. 16 and 17, the membrane humidifier 100 for a fuel cell according to the other embodiment of the present disclosure includes a middle case 110, cap cases 120, potting units 130, and assembly members 300.

The middle case 110 is coupled to the cap cases 120 to define the external appearance of the membrane humidifier. Each of the middle case 110 and the cap cases 120 may be made of hard plastic, such as polycarbonate, or metal. The lateral sectional shape of each of the middle case 110 and the cap cases 120 may be a circle, as shown in FIG. 16, or the lateral sectional shape thereof may be a polygon, as shown in FIG. 17. The polygon may be a rectangle, a square, a trapezoid, a parallelogram, a pentagon, or a hexagon, and corners of the polygon may be round. In addition, the circle may be an oval. The middle case 110 is provided with a second fluid inlet 112, through which a second fluid is supplied, and a second fluid outlet 113, through which the second fluid is discharged. Alternatively, reference numeral 113 may indicate the second fluid inlet, and reference numeral 112 may indicate the second fluid outlet.

A hollow fiber membrane module, in which a plurality of hollow fiber membranes is housed, is disposed in the middle case 110. The hollow fiber membrane module may include a hollow fiber membrane bundle constituted by a plurality of integrated hollow fiber membranes or a plurality of hollow fiber membrane cartridges 140 (see FIG. 18), in each of which hollow fiber membranes are housed. The drawings illustrate the case in which the hollow fiber membrane module includes hollow fiber membrane cartridges 140; however, the case in which the hollow fiber membrane module includes a hollow fiber membrane bundle is not excluded.

The cap cases 120 are coupled to the respective ends of the middle case 110. The cap cases 120 are provided with fluid introduction and discharge ports 121, one of which is a first fluid inlet and the other of which is a first fluid outlet. A first fluid introduced through the fluid introduction and discharge port 121 of one of the cap cases 120 passes through an inner pipeline of each of the hollow fiber membranes housed in each of the hollow fiber membrane cartridges 140 and is then discharged outside through the fluid introduction and discharge port 121 of the other cap case 120. Each hollow fiber membrane may be a hollow fiber membrane made of, for example, Nafion, polyetherimide, polyimide (PI), polyphenylsulfone, polysulfone (PS), or polyethersulfone (PES).

In the case in which the hollow fiber membrane module includes a plurality of hollow fiber membrane cartridges 140, the hollow fiber membrane cartridges C may be provided at one side thereof with a first mesh unit 142 configured to allow the second fluid introduced into the membrane humidifier through the second fluid inlet 112 to be introduced into the hollow fiber membrane cartridges 140 therethrough, and may be provided at the other side thereof with a second mesh unit (not shown) configured to allow the second fluid that has performed moisture exchange in the hollow fiber membrane cartridges 140 to be discharged from the hollow fiber membrane cartridges 140 therethrough.

The hollow fiber membrane bundle or the hollow fiber membrane cartridges 140 are provided at both ends thereof with potting units 130 configured to bind the hollow fiber membranes and to fill the gaps between the hollow fiber membranes. As a result, the both ends of the hollow fiber membrane module are blocked by the potting units 130, whereby a flow channel configured to allow the second fluid to pass therethrough is defined in the hollow fiber membrane module. Each of the potting units 130 is made of a known material, and a detailed description thereof will be omitted from this specification.

Figure 18:
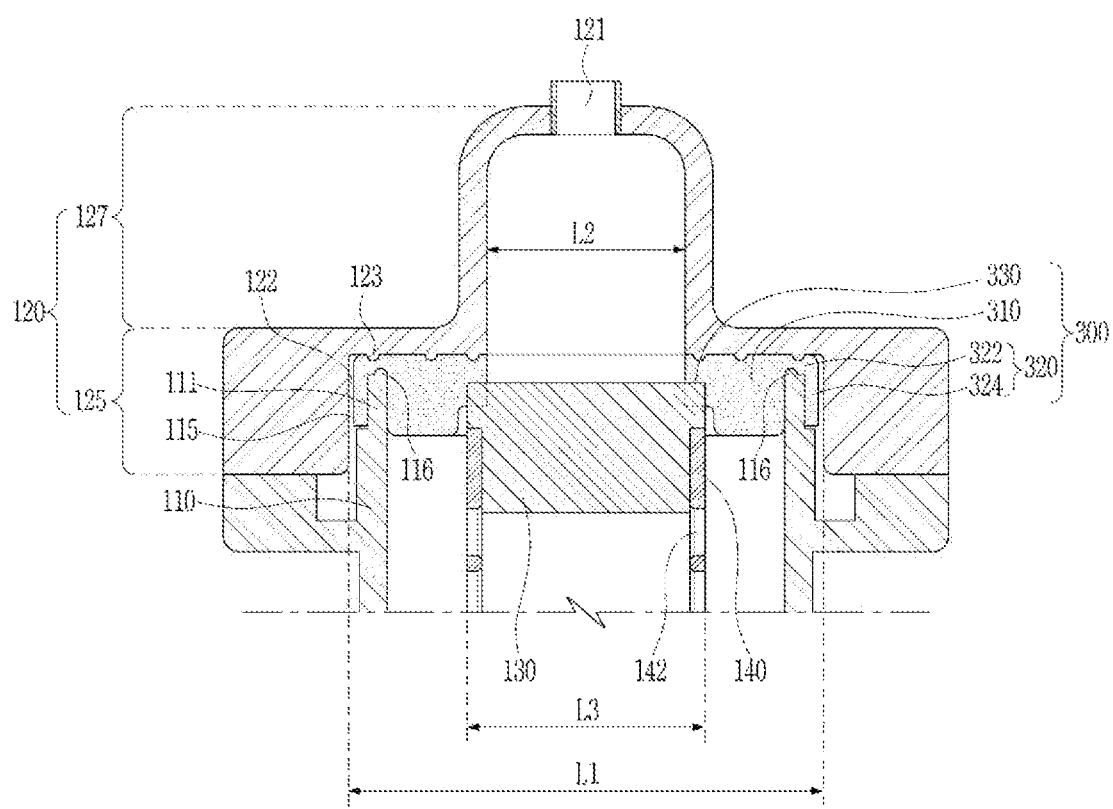
FIG. 18 is a sectional view showing a membrane humidifier according to a fourth embodiment of the present disclosure.
Figure 19:
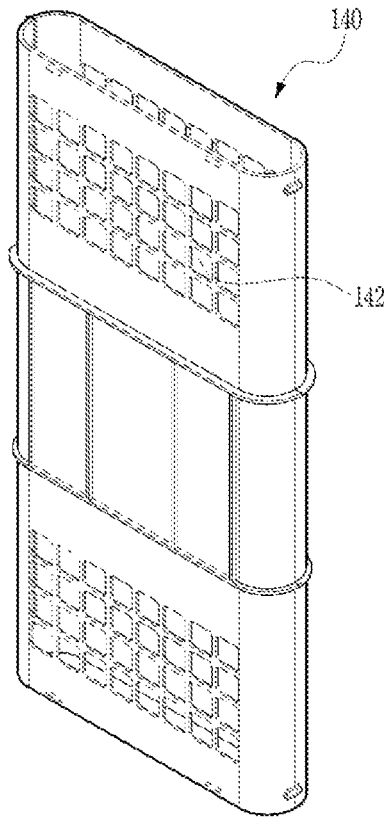
FIG. 19 is a perspective view showing a hollow fiber membrane cartridge according to an embodiment of the present disclosure.

FIG. 18 is a sectional view showing a membrane humidifier according to a fourth embodiment of the present disclosure, FIG. 9 is a perspective view showing a hollow fiber membrane cartridge according to an embodiment of the present disclosure, and FIG. 70 is a perspective view showing an assembly member according to an embodiment of the present disclosure.

Hereinafter, embodiments in which the hollow fiber membrane module includes a hollow fiber membrane cartridge 140 will be shown and described. In addition, only a single hollow fiber membrane cartridge 140 is shown in the drawings; however, the case in which a plurality of hollow fiber membrane cartridges 140 is included in the membrane humidifier is not excluded.

Figure 20A:
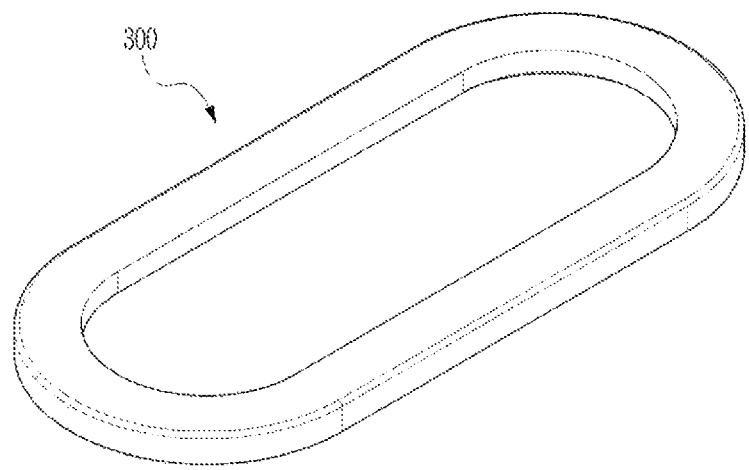
FIGS. 20A-20B are perspective views showing an assembly member according to an embodiment of the present disclosure.
Figure 20B:
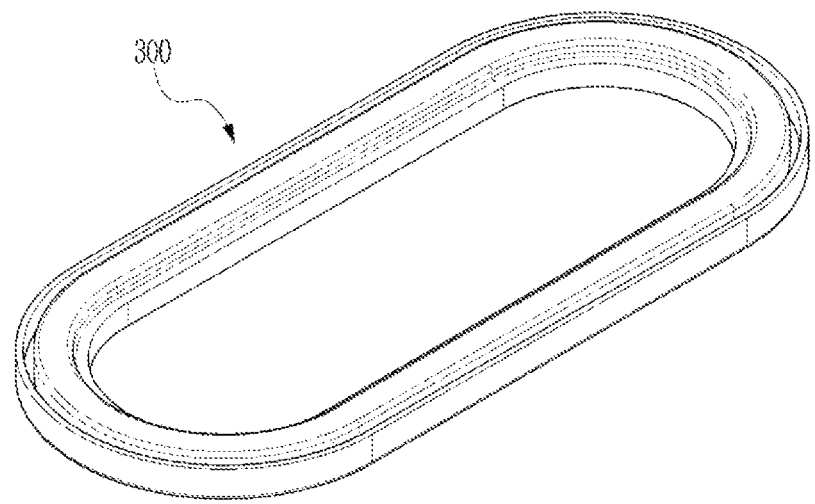

The hollow fiber membrane cartridge 140 of FIG. is one of a plurality of cartridges disposed in the case of the membrane humidifier. FIGS. 20A-20B shows an assembly member in the case in which a single cartridge and a potting unit are provided, and the shown assembly member 300 is configured so as to have a structure in which a pair of linear portions facing each other and a pair of semicircular portions facing each other are connected to each other. FIG. 20A is a perspective view when viewed from the side at which the assembly member contacts the cap case 120, and FIG. 20B is a perspective view when viewed from the opposite side.

The assembly member 300 is disposed between the end of the middle case 110 and the cap case 120. At the same time, the assembly member 300 may also be disposed between the cap case 120 and the potting unit 130.

The inner surface of the cap case 120 is assembled so as to be spaced apart from the end 111 of the middle case 110. In addition, the inner surface of the cap case 120 is also assembled so as to be spaced apart from the potting unit 130. As a result, the assembly member 300 is assembled so as to hermetically seal the gap between the cap case 120 and the middle case 110 and the gap between the cap case 120 and the potting unit 130.

The middle case 110 and the cap case 120 are assembled using various fastening methods (not shown), such as fastening using a plurality of bolts, pressing, welding, and clamping. At this time, assembly is performed such that the assembly member 300 is inserted into the gap between the middle case and the cap case and is then pressed. FIG. 18 and the following figures are sectional views taken along planes that do not pass through fastening units, such as bolts, and therefore fastening units, such as bolts, are not shown.

As previously described, each of the middle case 110 and the cap case 120 may have a polygonal or circular section. The sectional views of FIG. 18 and the following figures show the case in which each of the middle case 110 and the cap case 120 has a quadrangular section.

The cap case 120 may include a large-diameter portion 125 coupled to the middle case 110, the large-diameter portion having an inner diameter L1 greater than the outer diameter L3 of the potting unit 130, and a small-diameter portion 127 protruding from one surface of the large-diameter portion 125, the small-diameter portion having an inner diameter L2 less than the outer diameter L3 of the potting unit 130.

Here, the outer diameter, the inner diameter, the large-diameter portion, and the small-diameter portion are generally terms related to the diameter of a circular pipe; however, the cases in which a housing of the membrane humidifier is circular, oval, and polygonal are all included.

Particularly, in the case in which the housing of the membrane humidifier is polygonal, the distance L2 between opposite inner surfaces of the small-diameter portion 127 of the cap case 120, in which the fluid introduction and discharge port 121 is formed, is less than the distance L3 between opposite outer surfaces of the potting unit 130. Consequently, the assembly member 300 may be pressed between the cap case 120 and the potting unit 130 at the time of assembly. The shape of the cap case 120 may be applied to all of the following embodiments as well as the fourth embodiment without change.

In addition, the distance L3 between opposite outer surfaces of the potting unit 130 is less than the distance between opposite inner surfaces of the middle case 110, whereby the potting unit 130 is disposed in the middle case 110 so as to be spaced apart therefrom. Consequently, the assembly member 300 is disposed between the middle case 110 and the potting unit 130 to fix the potting unit 130 such that the potting unit cannot move relative to the middle case 110.

The assembly member 300 is assembled so as to simultaneously perform hermetic coupling between the middle case 110 and the cap case 120, between the cap case 120 and the potting unit 130, and between the middle case 110 and the potting unit 130.

The assembly member 300 includes a main body 310 disposed between the cap case 120, the middle case 110, and the potting unit 130, a first coupling portion 320 pressed between the cap case 120 and the end of the middle case 110 in order to perform hermetic coupling between the cap case 120 and the middle case 110, and a second coupling portion 330 brought into contact with one end of the potting unit 130 in order to perform hermetic coupling between the cap case 120 and the potting unit 130.

A pair of assembly members 300 is shown as being disposed in a horizontally symmetrical fashion in the sectional view of FIG. 18; however, it should be understood that, in actuality, a single assembly member 300 is generally formed so as to have a quadrangular ring shape.

The main body 310 is disposed on the inner surface of the cap case 120, the inner surface of the middle case 110, and the upper surface of the potting unit 130 in tight contact therewith.

The first coupling portion 320 is inserted and pressed into the gap between the cap case 120 and the end of the middle case 110. Specifically, the first coupling portion 320 may include a first extension portion 322 extending outwards from the main body 310 and a second extension portion 324 extending from the end of the extending portion so as to come into contact with the outer surface of the middle case 110. Consequently, a recess, into which the end of the middle case 110 is inserted, may be formed between the outer surface of the main body 310 and the inner surface of the second extension portion 324.

In addition, the outer surface of the second extension portion 324 may be in contact with the inner surface of the cap case 120, although not in contact with the inner surface of the cap case, as shown.

A step portion 115 configured to receive the second extension portion 324 of the first coupling portion 320 may be provided at the outer surface of the end 111 of the middle case 110. As a result, the outer surface of the middle case 110 and the outer surface of the second extension portion 324 may form almost the same plane.

The second coupling portion 330 is a portion at which the inner edge of the assembly member 300 is pressed against the edge of the potting unit 130.

The relative hardness of the assembly member 300 and the potting unit 130 may be variously configured. In the case in which the hardness of the assembly member 300 is less than the hardness of the potting unit 130, the second coupling portion 330 of the assembly member 300 is pressed and contracted by the potting unit 130 at the time of assembly. FIG. 18 shows this case.

In the case in which the hardness of the assembly member 300 is greater than the hardness of the potting unit 130, on the other hand, the edge of the potting unit 130 may be pressed and contracted by the second coupling portion 330 of the assembly member 300 at the time of assembly. The region of the second coupling portion 330 indicated by a dotted line shows the external appearance of the second coupling portion before being pressed by the potting unit 130. Of course, in the case in which the hardness of the assembly member 300 and the hardness of the potting unit 130 are similar to each other, the pressed regions of the assembly member 300 and the potting unit 130 may be simultaneously contracted at the time of assembly.

Preferably, the cap case 120 includes a protrusion 123 protruding from a surface thereof, the surface facing the end 111 of the middle case 110. The protrusion 123 may be formed in the shape of a rib having a semicircular section or any of various other shapes. In particular, the protrusion 123 serves to further press the first coupling portion 320 of the assembly member 300, thereby improving hermetic sealing, and to fix the first coupling portion 320 such that the first coupling portion cannot move when pressed.

The protrusion 123 of the cap case 120 may be formed at the position facing the end of the middle case 110, or may also be formed at the position facing the border of the potting unit 130. In addition, a protrusion may be formed between the two protrusions.

A protrusion 116 formed in the shape of a rib having a semicircular section may also be provided at the end 111 of the middle case 110. The protrusion 116 of the middle case 110 and the protrusion 123 of the cap case 120 may be disposed so as to be staggered from each other, rather than facing each other. In the case in which the two protrusions are disposed so as to be staggered from each other, hermetic sealing may be further improved when the assembly member 300 is pressed.

Figure 21:
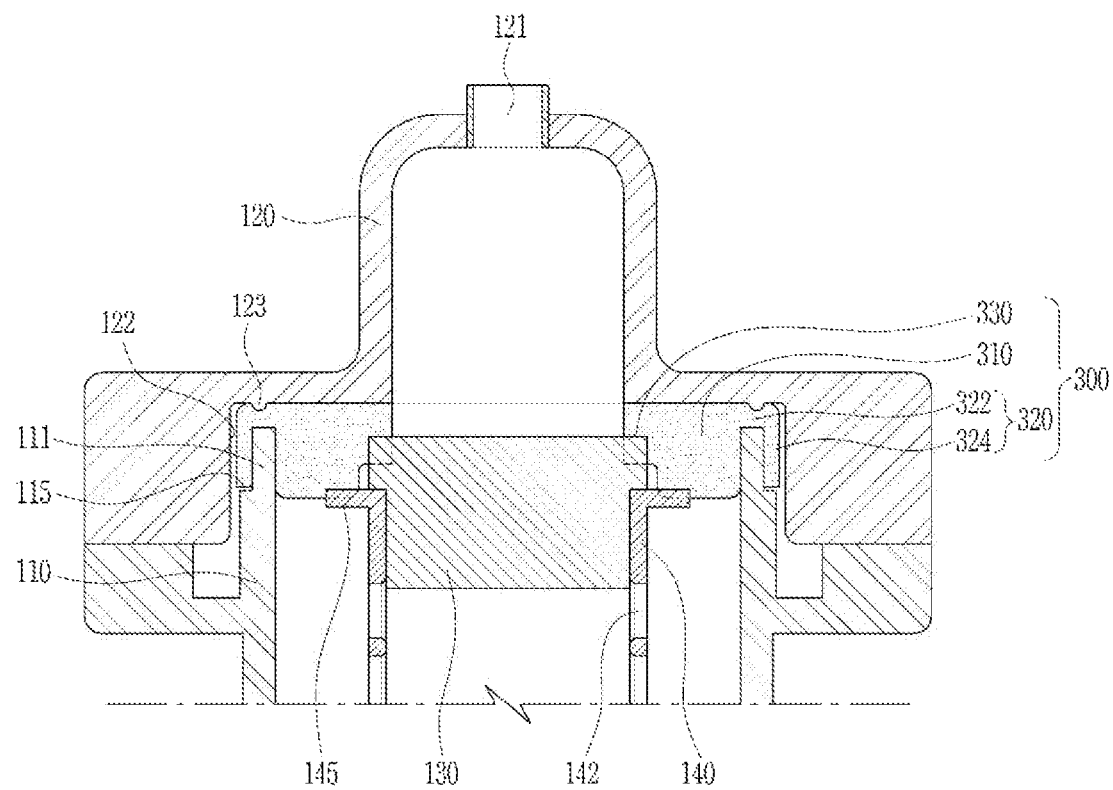
FIG. 21 is a sectional view showing a membrane humidifier according to a fifth embodiment of the present disclosure.

FIG. 21 is a sectional view showing a membrane humidifier according to a fifth embodiment of the present disclosure. The membrane humidifier according to the fifth embodiment is different from the membrane humidifier according to the fourth embodiment in that the cartridge 140 includes an extension rib 145 configured to support one surface of the assembly member 300.

As previously described, in the embodiments shown in FIGS. 18 to 25, a plurality of hollow fiber membranes are housed in a cartridge 140, and the cartridge or a plurality of cartridges is disposed in the middle case 110.

On the assumption that the direction shown in FIG. 21 is a standard direction, the extension rib 145 extends outwards from the upper end of the cartridge 140 so as to support the lower surface of the assembly member 300. The extension rib 145 may be formed so as to press and support a portion or the entirety of the lower surface of the main body 310 of the assembly member 300.

In the case in which the cartridge 140 is configured in the shape of a quadrangular pipe, the extension rib 145 may be configured in the shape of a quadrangular ring having a predetermined width. Of course, in the case in which the cartridge 140 is configured in the shape of a circular pipe, the extension rib 145 may be configured in the shape of a circular ring having a predetermined width.

When the assembly member 300 is assembled, the first coupling portion 320 is pressed by the end 111 of the middle case 110, and the second coupling portion 330 is pressed by the potting unit 130. The main body 310 of the assembly member 300 is also pressed against the cap case 120 by the extension rib 145, whereby the entirety of the assembly member 300 is uniformly pressed, and therefore hermetic sealing is further improved.

Figure 22:
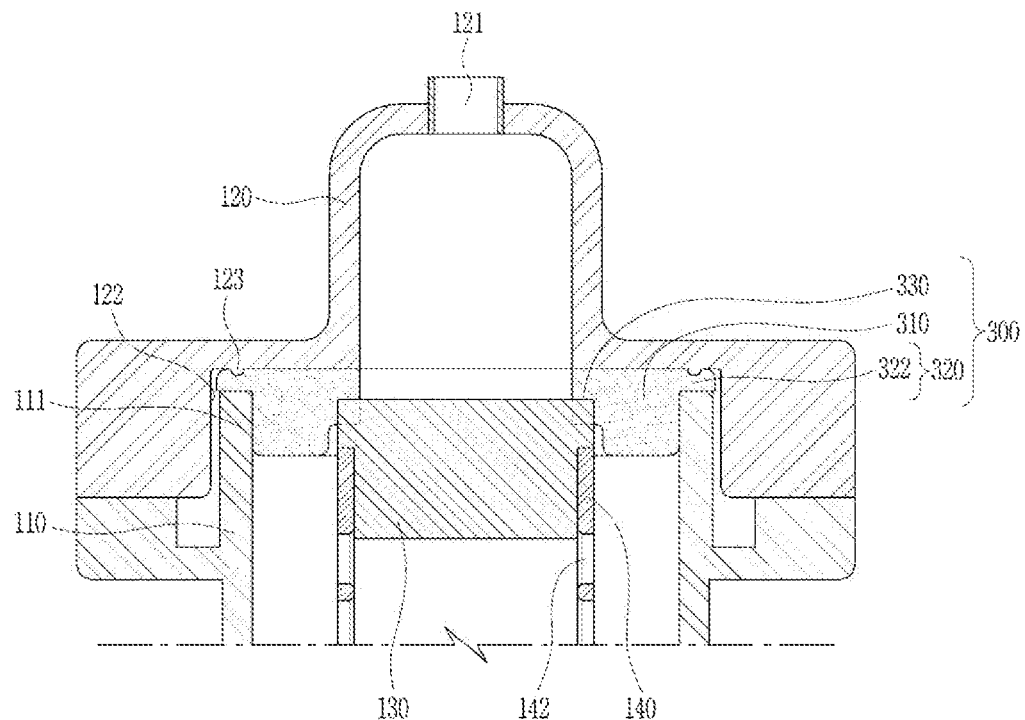
FIG. 22 is a sectional view showing a membrane humidifier according to a sixth embodiment of the present disclosure.

FIG. 22 is a sectional view showing a membrane humidifier according to a sixth embodiment of the present disclosure. The membrane humidifier according to the sixth embodiment is different from the membrane humidifier according to the fourth embodiment in that the first coupling portion 320 includes no second extension portion.

The first coupling portion 320 of the assembly member 300 includes a first extension portion 322 extending outwards from the main body 310 but does not include a second extension portion extending from the end of the first extension portion 322 so as to come into contact with the outer surface of the middle case.

As a result, no step portion is formed at the end 111 of the middle case 110, and the end 111 is formed so as to have a predetermined thickness and is assembled so as to press the first extension portion 322.

In addition, a protrusion 123 formed on the inner surface of the cap case 120 presses the first extension portion 322, whereby the first extension portion 322 may securely perform hermetic coupling between the cap case 120 and the end 111 of the middle case 110.

Figure 23:
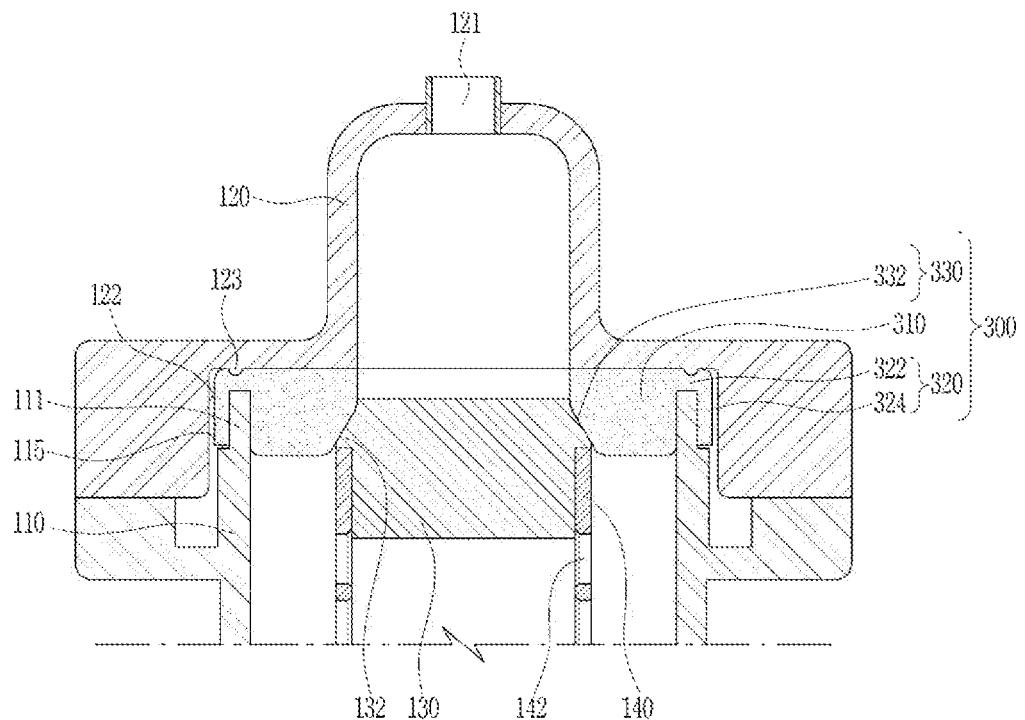
FIG. 23 is a sectional view showing a membrane humidifier according to a seventh embodiment of the present disclosure.

FIG. 23 is a sectional view showing a membrane humidifier according to a seventh embodiment of the present disclosure. The membrane humidifier according to the seventh embodiment is different from the membrane humidifier according to the fourth embodiment in that inclined surfaces are formed on the edges of the second coupling portion 330 of the assembly member 300 and the potting unit 130 so as to come into contact with each other.

An inclined portion 322 is formed at the second coupling portion 330, and an inclined portion 132 is also formed at the edge of the upper end of the potting unit 130. In the case of the embodiment shown in FIG. 23, the hardness of the assembly member 300 is greater than the hardness of the potting unit 130, and therefore the inclined portion 322 of the second coupling portion 330 presses the inclined portion 132 of the potting unit 130 at the time of assembly.

In the case in which the hardness of the potting unit 130 is greater than the hardness of the assembly member 300, on the other hand, the inclined portion 132 of the potting unit 130 presses the inclined portion 322 of the second coupling portion 330 at the time of assembly.

Since the inclined portion of the second coupling portion 330 of the assembly member 300 and the inclined portion of the potting unit 130 are pressed against each other, hermetic sealing performance may be further improved compared to the other embodiments.

In addition, only one of the inclined portion 322 of the second coupling portion 330 and the inclined portion 132 of the potting unit 130 may be formed, although both may be simultaneously formed. In this case, the inclined portion may be formed at any one of the assembly member 300 and the potting unit 130 that has higher hardness, and the other that has lower hardness may be pressed by the inclined portion and thus may be deformed so as to have an inclined surface.

Figure 24:
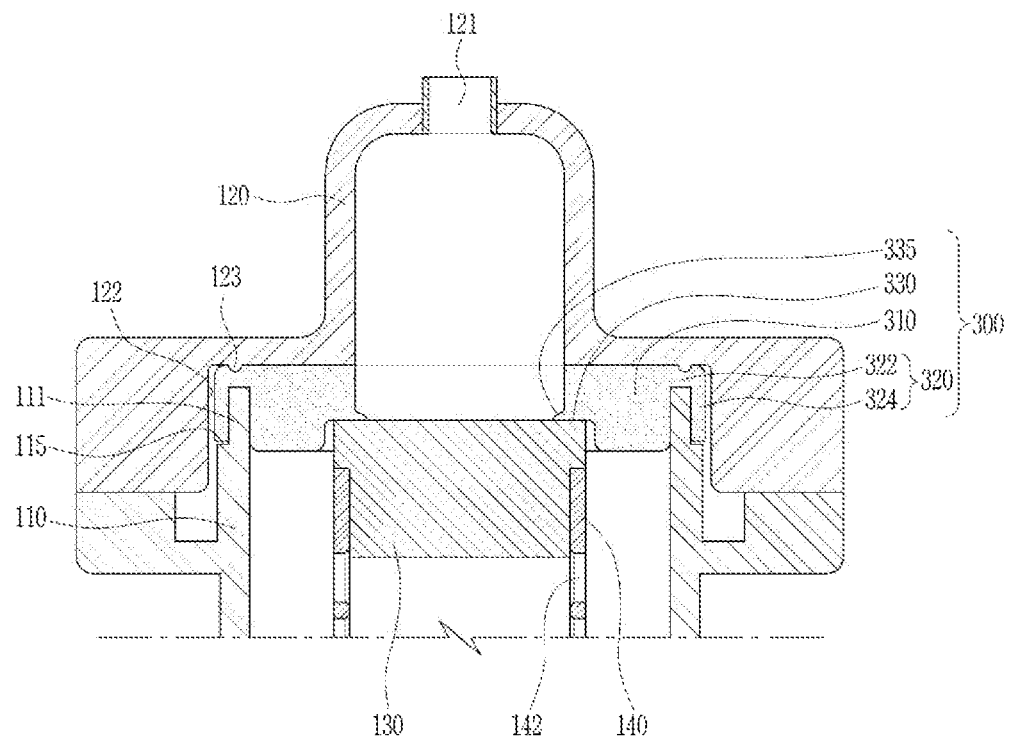
FIG. 24 is a sectional view showing a membrane humidifier according to an eighth embodiment of the present disclosure.

FIG. 24 is a sectional view showing a membrane humidifier according to an eighth embodiment of the present disclosure. The membrane humidifier according to the eighth embodiment is different from the membrane humidifier according to the fourth embodiment in that the assembly member 300 further includes a rib 335 extending toward the potting unit 130.

A rib 335 extending inwards so as to come into tight contact with one side surface of the potting unit 130 is formed at the second coupling portion 330 of the assembly member 300. The sectional shape of the rib 335 may be a triangular shape, the thickness of which gradually decreases toward the end thereof.

When the membrane humidifier is assembled, pressure higher than atmospheric pressure is generally applied to a space defined by the cap case 120, the assembly member 300, and the potting unit 130, although the value of pressure varies depending on the use conditions of a fuel cell system. The rib 335 may be brought into tight contact with one side surface of the potting unit 130 by the pressure, whereby it is possible to more securely achieve hermetic coupling therebetween.

The assembly member 300 of the eighth embodiment may have higher hardness than the assembly member 300 of the fourth embodiment. In other words, hermetic sealing between the assembly member 300 of the eighth embodiment and the potting unit 130 may be further improved due to the rib 335 although the assembly member is not greatly deformed when pressed at the time of assembly.

In addition, FIG. 24 shows the state after assembly. The lower surface of the rib 335 may be formed so as to be parallel to the contact surface of the potting unit 130, or may be formed so as to be inclined at a predetermined angle to the contact surface of the potting unit 130. In the case in which the rib 335 is formed so as to be inclined, the rib 335 may be deformed by the potting unit at the time of assembly, whereby the rib may be brought into tighter contact with the potting unit 130.

Figure 25:
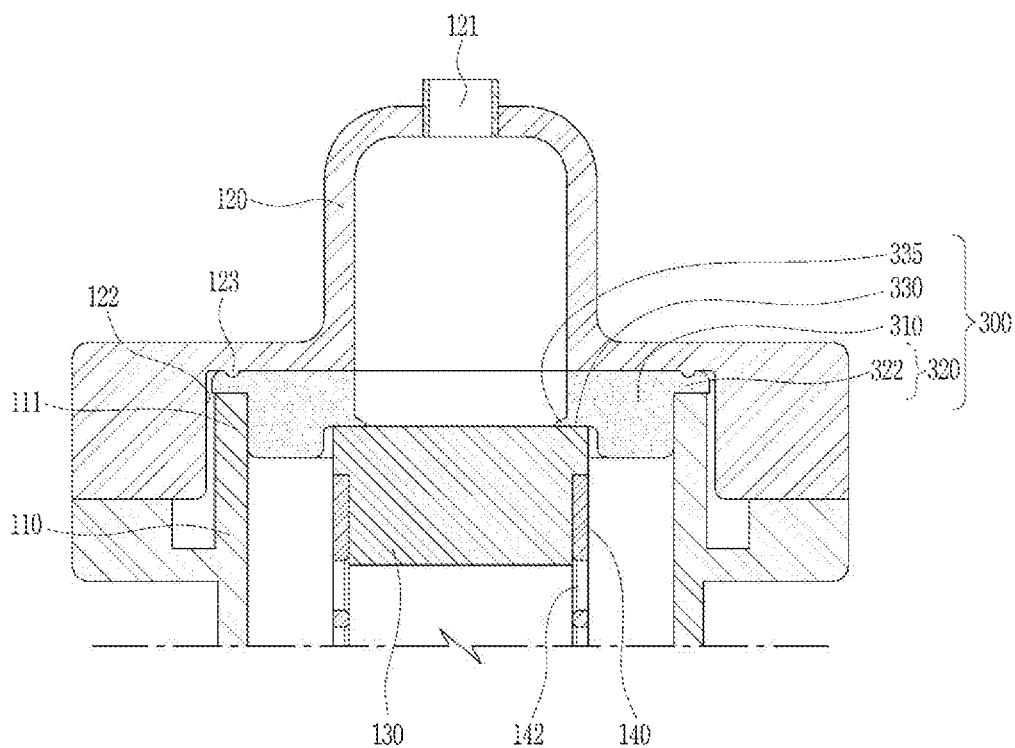
FIG. 25 is a sectional view showing a membrane humidifier according to a ninth embodiment of the present disclosure.

FIG. 25 is a sectional view showing a membrane humidifier according to a ninth embodiment of the present disclosure. The membrane humidifier according to the ninth embodiment is different from the membrane humidifier according to the eighth embodiment in that the first coupling portion 320 includes no second extension portion. The membrane humidifier according to the ninth embodiment is identical to the membrane humidifier according to the eighth embodiment in that the assembly member 300 further includes a rib 335 extending parallel with one side surface of the potting unit 130.

In the case of the ninth embodiment, the assembly member 300 includes a rib 335, whereby the difference in hardness between the assembly member 300 and the potting unit 130 may be less than the difference in hardness therebetween in the case of the eighth embodiment. In order words, hermetic sealing between the assembly member 300 of the ninth embodiment and the potting unit 130 may be further improved due to the rib 335 although the assembly member is not greatly deformed when pressed at the time of assembly.

The first coupling portion 320 of the assembly member 300 includes a first extension portion 322 extending outwards from the main body 310 but does not include a second extension portion extending from the end of the first extension portion 322 so as to come into contact with the outer surface of the middle case.

As a result, no step portion is formed at the end 111 of the middle case 110, and the end 111 is formed so as to have a predetermined thickness and is assembled so as to press the first extension portion 322. At this time, a protrusion 123 formed on the inner surface of the cap case 120 presses the first extension portion 322, whereby the first extension portion 322 may securely perform hermetic coupling between the cap case 120 and the end 111 of the middle case 110.

Although embodiments of the present disclosure have been described above, it will be apparent to a person having ordinary skill in the art to which the present disclosure pertains that the present disclosure can be variously modified and altered through addition, change, deletion, or supplement of components without departing from the idea of the present disclosure recited in the following claims and that such modifications and alterations fall within the scope of right of the present disclosure.

INDUSTRIAL APPLICABILITY

A membrane humidifier for a fuel cell including an assembly member according to each of various embodiments of the present disclosure is capable of performing a hermetic sealing function in high-temperature/high-pressure/high-humidity environments through a mechanical assembly structure.

In addition, a mechanical sealing method is used instead of a chemical sealing method, whereby it is possible to omit a polyurethane/sealant coating and curing process necessary in a conventional chemical sealing method, and therefore it is possible to shorten working time, to improve work efficiency, and to construct a mass production system.

In addition, when unit cartridges disposed in the membrane humidifier are defective, reworkability is excellent, whereby it is possible to reduce a part scrap rate.

In addition, the membrane humidifier may be disassembled, only defective cartridges may be replaced, and then the membrane humidifier may be reassembled, whereby the present disclosure is advantageous in terms of reworkability and reuse of parts.

Furthermore, it is possible to simultaneously perform hermetic coupling between two or more parts using two separable assembly members or a single integrated assembly member, whereby manufacture and assembly are very convenient and efficient.

The invention claimed is:

1. A membrane humidifier for a fuel cell, the membrane humidifier comprising:
   a middle case housing a plurality of hollow fiber membranes;
   a cap case coupled to the middle case;
   a potting unit formed at ends of the plurality of hollow fiber membranes, the potting unit being spaced apart from the middle case; and
   an assembly member disposed between the cap case and an end of the middle case and between the middle case and the potting unit through a mechanical assembly, the assembly member is pressed during the mechanical assembly so as to simultaneously perform hermetic coupling between the cap case and the middle case, between the cap case and the potting unit, and between the middle case and the potting unit.

2. The membrane humidifier according to claim 1, wherein the assembly member comprises a first sealing unit mounted on the end of the middle case while being in contact with an inner wall of the cap case and a second sealing unit formed inside the first sealing unit so as to wrap the potting unit.

3. The membrane humidifier according to claim 2, wherein the first sealing unit comprises a first sealing body mounted on the end of the middle case while being in contact with the inner wall of the cap case, the first sealing body being formed so as to have a bracket shape, and a first sealing leg formed so as to come into contact with the second sealing unit while extending downwards from one end of the first sealing body.

4. A membrane humidifier for a fuel cell, the membrane humidifier comprising:
   a middle case housing a plurality of hollow fiber membranes;
   a cap case coupled to the middle case;

a potting unit formed at ends of the plurality of hollow fiber membranes; and an assembly member disposed between the cap case and an end of the middle case, the assembly member being configured to simultaneously perform hermetic coupling between the cap case and the middle case and between the cap case and the potting unit, wherein the assembly member comprises a first sealing unit mounted on the end of the middle case while being in contact with an inner wall of the cap case and a second sealing unit formed inside the first sealing unit so as to wrap the potting unit, wherein the first sealing unit comprises a first sealing body mounted on the end of the middle case while being in contact with the inner wall of the cap case, the first sealing body being formed so as to have a bracket shape, and a first sealing leg formed so as to come into contact with the second sealing unit while extending downwards from one end of the first sealing body; and wherein the first sealing unit further comprises an extension leg extending inwards from an end of the first sealing leg and then extending upwards from the end thereof such that the extension leg wraps the second sealing unit.

5. The membrane humidifier according to claim 3, wherein the first sealing unit further comprises a second sealing leg extending downwards from the other end of the first sealing body, the second sealing leg being in contact with the inner wall of the cap case and the end of the middle case.

6. The membrane humidifier according to claim 4, wherein the first sealing unit further comprises a second sealing leg extending downwards from the other end of the first sealing body, the second sealing leg being in contact with the inner wall of the cap case and the end of the middle case.

7. A membrane humidifer for a fuel cell, the membrane humidifer comprising:

a middle case housing a plurality of hollow fiber membranes;

a cap case coupled to the middle case;

a potting unit formed at ends of the plurality of hollow fiber membranes; and an assembly member disposed between the cap case and an end of the middle case, the assembly member being configured to simultaneously perform hermetic coupling between the cap case and the middle case and between the cap case and the potting unit, wherein the assembly member comprises a first sealing unit mounted on the end of the middle case while being in contact with an inner wall of the cap case and a second sealing unit formed inside the first sealing unit so as to wrap the potting unit, wherein the first sealing unit comprises a first sealing body mounted on the end of the middle case while being in contact with the inner wall of the cap case, the first sealing body being formed so as to have a bracket shape, and a first sealing leg formed so as to come into contact with the second sealing unit while extending downwards from one end of the first sealing body, and wherein the second sealing unit comprises a second sealing body formed so as to wrap the potting unit and a sealing arm inserted into the first sealing body.

8. The membrane humidifier according to claim 2, wherein the first sealing unit is softer than the second sealing unit.

9. The membrane humidifier according to claim 1, wherein the cap case comprises a large-diameter portion coupled to the middle case, the large-diameter portion having an inner diameter greater than an outer diameter of the potting unit, and a small-diameter portion protruding from one surface of the large-diameter portion, the small-diameter portion having an inner diameter less than the outer diameter of the potting unit.

10. The membrane humidifier according to claim 1, wherein the assembly member comprises:

a main body disposed between the cap case, the middle case, and the potting unit;

a first coupling portion pressed between the cap case and the end of the middle case in order to perform hermetic coupling between the cap case and the middle case; and a second coupling portion brought into contact with one end of the potting unit in order to perform hermetic coupling between the cap case and the potting unit.

11. The membrane humidifier according to claim 10, wherein the first coupling portion comprises a first extension portion extending outwards from the main body.

12. A membrane humidifier for a fuel cell, the membrane humidifier comprising:

a middle case housing a plurality of hollow fiber membranes;

a cap case coupled to the middle case;

a potting unit formed at ends of the plurality of hollow fiber membranes; and an assembly member disposed between the cap case and an end of the middle case, the assembly member being configured to simultaneously perform hermetic coupling between the cap case and the middle case and between the cap case and the potting unit, wherein the assembly member comprises:

a main body disposed between the cap case, the middle case, and the potting unit;

a first coupling portion pressed between the cap case and the end of the middle case in order to perform hermetic coupling between the cap case and the middle case; and a second coupling portion brought into contact with one end of the potting unit in order to perform hermetic coupling between the cap case and the potting unit, wherein the first coupling portion comprises a first extension portion extending outwards from the main body, and wherein the first coupling portion further comprises a second extension portion extending from an end of the first extension portion so as to come into contact with an outer surface of the middle case.

13. The membrane humidifier according to claim 12, wherein a step portion configured to receive the second extension portion of the first coupling portion is provided at an outer surface of the end of the middle case.

14. The membrane humidifier according to claim 1, wherein the cap case comprises a protrusion protruding from a surface thereof, the surface facing the end of the middle case.

15. The membrane humidifier according to claim 10, wherein the second coupling portion of the assembly member comprises an inclined portion formed at an inner surface thereof, and the potting unit comprises an inclined portion formed at an end edge thereof, the inclined portion of the potting unit being in contact with the inclined portion of the second coupling portion.

16. A membrane humidifier for a fuel cell, the membrane humidifier comprising:
- a middle case housing a plurality of hollow fiber membranes;
- a cap case coupled to the middle case;
- a potting unit formed at ends of the plurality of hollow fiber membranes; and
- an assembly member disposed between the cap case and an end of the middle case, the assembly member being configured to simultaneously perform hermetic coupling between the cap case and the middle case and between the cap case and the potting unit,
- wherein hardness of the assembly member is less than hardness of the potting unit.

17. The membrane humidifier according to claim 16, wherein
- the plurality of hollow fiber membranes is housed in a cartridge, and
- the cartridge comprises an extension rib extending outwards from one end thereof, the extension rib being configured to support one surface of the assembly member.

18. A membrane humidifier for a fuel cell, the membrane humidifier comprising:
- a middle case housing a plurality of hollow fiber membranes;
- a cap case coupled to the middle case;
- a potting unit formed at ends of the plurality of hollow fiber membranes; and
- an assembly member disposed between the cap case and an end of the middle case, the assembly member being configured to simultaneously perform hermetic coupling between the cap case and the middle case and between the cap case and the potting unit,
- wherein hardness of the assembly member is greater than hardness of the potting unit and is less than hardness of the middle case and hardness of the cap case.

19. The membrane humidifier according to claim 10, wherein the assembly member further comprises a rib extending inwards so as to widen a surface area thereof that contacts the potting unit.

20. A membrane humidifier for a fuel cell, the membrane humidifier comprising:
- a middle case housing a plurality of hollow fiber membranes;
- a cap case coupled to the middle case;
- a potting unit formed at ends of the plurality of hollow fiber membranes; and
- an assembly member disposed between the cap case and an end of the middle case, the assembly member being configured to simultaneously perform hermetic coupling between the cap case and the middle case and between the cap case and the potting unit,
- wherein the assembly member comprises:
- a main body disposed between the cap case, the middle case, and the potting unit;
- a first coupling portion pressed between the cap case and the end of the middle case in order to perform hermetic coupling between the cap case and the middle case; and
- a second coupling portion brought into contact with one end of the potting unit in order to perform hermetic coupling between the cap case and the potting unit,
- wherein the assembly member further comprises a rib extending inwards so as to widen a surface area thereof that contacts the potting unit, and
- wherein hardness of the assembly member is greater than hardness of the potting unit and is less than hardness of the middle case and hardness of the cap case.

* * * * *